(12) United States Patent
Munekata

(10) Patent No.: US 11,493,131 B2
(45) Date of Patent: Nov. 8, 2022

(54) SEAL RING GROUPS

(71) Applicant: Ishikawa Gasket Co., Ltd., Tokyo (JP)

(72) Inventor: Yutaka Munekata, Tokyo (JP)

(73) Assignee: ISHIKAWA GASKET CO., LTD., Tokyo (JP)

( * ) Notice: Subject to any disclaimer, the term of this patent is extended or adjusted under 35 U.S.C. 154(b) by 93 days.

(21) Appl. No.: 16/921,045

(22) Filed: Jul. 6, 2020

(65) Prior Publication Data

US 2021/0062917 A1 Mar. 4, 2021

(30) Foreign Application Priority Data

Sep. 4, 2019 (JP) .............................. JP2019-161273

(51) Int. Cl.
*F16J 15/10* (2006.01)
*F02F 11/00* (2006.01)

(52) U.S. Cl.
CPC ............. *F16J 15/10* (2013.01); *F02F 11/002* (2013.01); *F05D 2240/55* (2013.01)

(58) Field of Classification Search
CPC .......... F16J 15/10; F16J 15/08; F16J 15/0818; F16J 2015/0862; F16J 2015/0863; F05D 2240/55
See application file for complete search history.

(56) References Cited

U.S. PATENT DOCUMENTS

| | | | |
|---|---|---|---|
| 5,586,770 A | * | 12/1996 | Udagawa ............... F16J 15/061 |
| | | | 277/598 |
| 2012/0205877 A1 | * | 8/2012 | Schumacher .... A63B 21/00178 |
| | | | 277/600 |

FOREIGN PATENT DOCUMENTS

| | | |
|---|---|---|
| JP | H11-118039 A | 4/1999 |
| JP | 2016-029301 A | 3/2016 |

* cited by examiner

*Primary Examiner* — Gilbert Y Lee
(74) *Attorney, Agent, or Firm* — Manabu Kanesaka

(57) ABSTRACT

Seal ring groups to be assembled with edges of through holes of a gasket includes a plurality of sealing groups. One of the plurality of sealing groups has an inner peripheral shape different from an inner peripheral shape of another of the plurality of sealing groups to distinguish one sealing group from another sealing group.

2 Claims, 2 Drawing Sheets

SEAL RING GROUPS

BACKGROUND OF THE INVENTION

The present invention relates to seal ring groups, in particular to a plurality of seal ring groups, wherein the seal rings which are assembled with edges of through holes are separated to a plurality of seal ring groups.

There are proposed seal rings which are provided with projections projecting radially inwardly from an inner surface thereof. (For example, Patent Documents 1 and 2)

Patent Document 1: Japanese Patent Publication No. 2016-029301.

Patent Document 2: Japanese Patent Publication No. H11-118039.

SUMMARY OF THE INVENTION

Seal rings are classified to several kinds according to differences of a subject to be assembled and a using object. The seal rings which are made by the similar material look, even if kinds are different, no difference in their appearances. Therefore, there is a problem such that different kind of a seal ring desired to be assembled with may be assembled incorrectly by mistake.

The present invention has been made in view of the above problem, and it is an object of the invention to provide seal rings which can be assembled correctly with parts without incorrectly assembling with the parts.

Means to Solve the Problems

According to the present invention, seal ring groups are assembled with edges of through holes of a gasket. The seal ring groups comprises a plurality of sealing groups. One of the plurality of sealing groups has an inner peripheral shape different from an inner peripheral shape of another of the plurality of sealing groups.

The plurality of sealing groups has at least one projection projecting inwardly from an inner peripheral face thereof, the at least one projection of the one of the plurality of sealing groups being different from the another of the plurality of sealing groups.

When the projections of the sealing groups are seen, the sealing groups can be easily identified. Thus, the seal rings can be positioned at proper positions without fail.

DETAILED DESCRIPTION OF THE INVENTION

Figure 1:
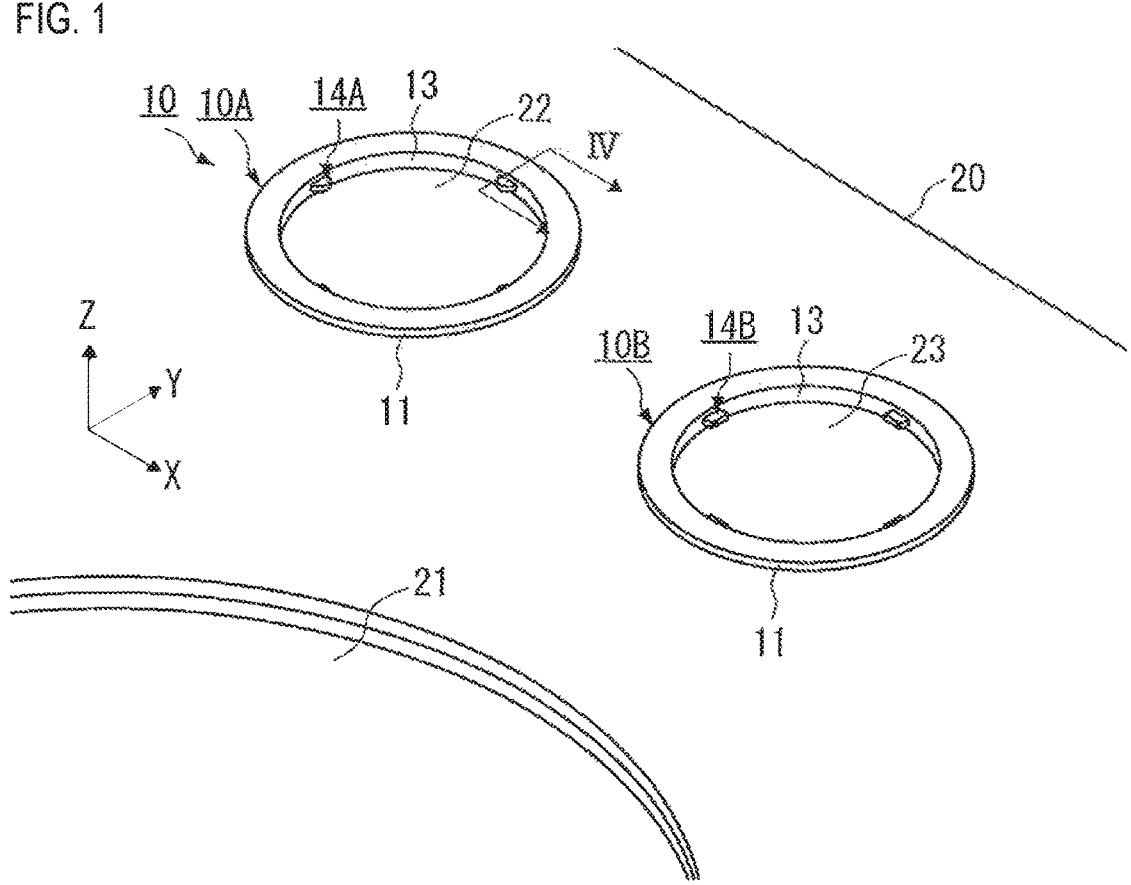
FIG. 1 is a perspective view showing an embodiment of seal ring groups of the invention.

Herein below, the examples of the present invention are explained with reference to the drawings. In the drawings, an X-direction and a Y-direction are perpendicular to each other in a plan view, and are shown in annular radial directions of the seal rings 10A and 10B, and a Z-direction is a vertical direction which is an annular axis direction of the seal rings 10A and 10B. Incidentally, in FIGS. 1-4, the sizes thereof are changed to easily understand the structure, and the sizes do not necessary correspond to the sizes actually made in its ratio.

As shown in FIG. 1, the seal ring groups 10 of the embodiment comprises a plurality of seal rings 10A, 10B which are different in kind. Incidentally, the seal ring groups 10 are not limited to two, and they may be three kinds of groups.

The kind used herein shows the difference of a subject to be assembled and a using object, and the difference in the material to be made and the manufacturing steps. Actually, as a kind of the present embodiment, the difference is a product number and a manufacturing number, wherein the seal rings 10A is a product number N1, and the seal rings 10B is a product number N2.

The subject that the seal rings 10A and 10B are assembled with is a cylinder head gasket 20 of the internal combustion engine. The seal rings 10A is assembled with an edge of a water hole 22, which is a through hole for a water jacket formed around a cylinder bore 21 of the cylinder head 20, and seals a cooling water passing through the water hole 22. The seal rings 10B is assembled with ab edge of an oil hole 23, which is a through hole for an oil hole 23, and seals a lubricating oil passing through the oil hole 23. The seal ring groups 10 disclosed herein can be used other than the cylinder head gasket 20, and for example, it is possible to use for a manifold. Incidentally, the diameters of the water hole 22 and the oil hole 23 are same.

Figure 2:
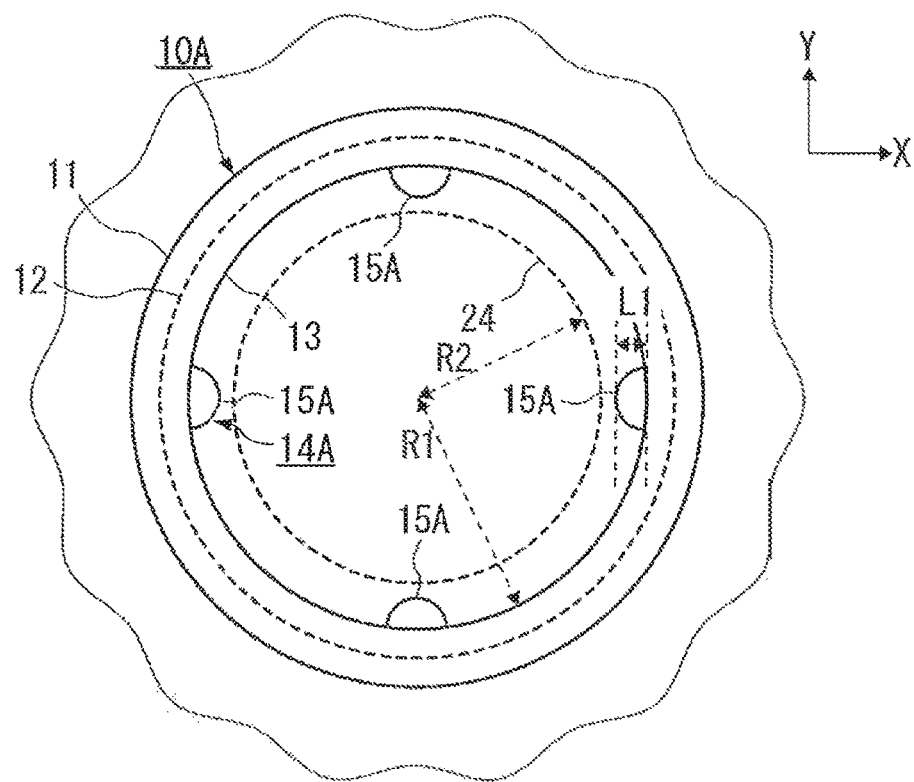
FIG. 2 is a plan view showing one of the seal rings shown in FIG. 1.
Figure 3:
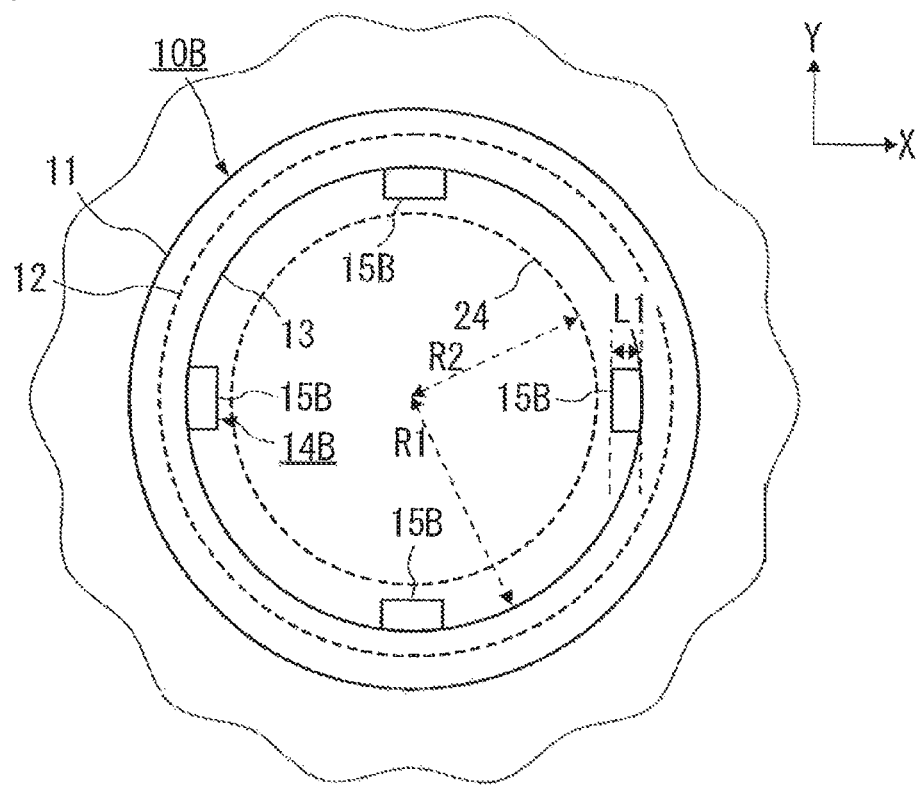
FIG. 3 is a plan view showing another of the seal rings shown in FIG. 1.

As shown in FIGS. 2 and 3, the structures of the seal rings 10A and the seal rings 10B are similar in the present embodiment, and the structures except for the different part are assigned with the same numerals, and explained accordingly.

Figure 4:
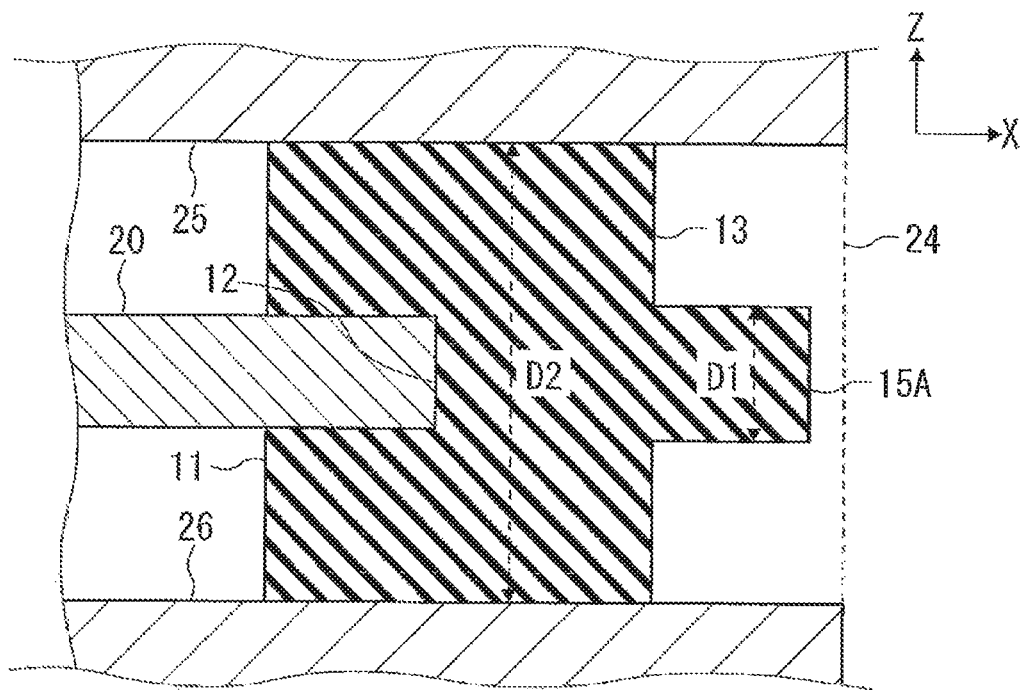
FIG. 4 is a cross-sectional view along an allow IV in FIG. 1.

As shown in FIGS. 2-4, the seal rings 10A, 10B are formed of a material mainly made of rubber, and have an annular shape in the Z-direction. In the seal rings 10A, a sealing subject is cooling water, and the components for the sealing ring 10A is made for sealing the cooling water. In the seal rings 10B, a sealing subject is lubricating oil, and the components for the sealing ring 10B is made for sealing the lubricating oil.

The seal rings 10A 10B may be an annular in the Z-direction, and have a cylindrical form or circular form, for example. The seal rings 10A, 10B have a groove 12 concaved in a direction radially inwardly from an outer circumference 11 in all around the annular circumference, wherein an edge of the water hole 22 and an edge of the oil hole 23 are engaged with the grooves 12.

The inner peripheral face 13A of the seal rings 10A is different from the inner peripheral face 13B in shape viewing from the Z-direction. In the present embodiment, the differences between the shape of the inner peripheral face 13A and the shape of the inner peripheral face 13B are difference in shapes of a projecting section 14A and a projecting section 14B.

The seal rings 10A includes projections 14A projecting inwardly in the annular radial direction at the inner surface 13. Also, the seal rings 10B includes projections 14B projecting inwardly in the annular radial direction at the inner surface 13. The projecting section 14A and the projecting section 14B have different from each other in the structure. In the present embodiment, the four projections 15A forming the projections 14A are different in shape from the four projections 15B forming the projections 14B from the view in the Z-direction. Actually, the projection 15A of the projecting section 14A has an half spherical shape in the shape viewing from the Z-direction, and the projection 15B of the projecting section 14B has a polygonal shape viewing from the Z-direction. Incidentally, the shape of the projection 15A viewing from the Z-direction and the shape of the projection 15B viewing from the Z-direction are different from each other, and it is sufficient to distinguish from each other. The shapes are not limited to the half spherical shape or polygonal shape.

The projections 14A comprise four projections 15A, and are formed such that the four projections 15A are arranged equally spaced apart from each other in the inner surface 13 from the view in the Z-direction. Similarly, the projections 14B comprises four projections 15B, and are formed such that the four projections 15B are arranged equally spaced apart from each other in the inner surface 13 from the view in the Z-direction. Namely, in the present embodiment, the number and the arrangement of the projections 15A in the projections 14A are the same as those of the projections 15B in the projections 14B.

It is desirable that the projections 15A, 15B do not enter into a fluid path 24 for a sealing subject fluid shown in the dotted lines in the drawing viewing from the Z-direction. In practice, it is formed such that the inner face 13 of the seal rings 10A, 10B is located outside the annular diameter more than the outer periphery of the fluid path 24, and the projections 15A, 15B are located at an empty space between the inner surface 13 and the outer periphery of the fluid path 24. The radius R1 of the inner surface 13 is greater than the radius R2 of the fluid path 24, and the projecting length L1 of the projections 15A, 15B from the inner face 13 is shorter that the value where the radius R1 is deducted from the radius R2.

The fluid paths 24 of the seal subject fluids in the present invention are fluid paths where fluids for the seal rings 10A, 10B pass. In particular, the fluid paths 24 for the seal subject fluids in the embodiment are the fluid paths where cooling water and lubricating oil flow in a case the seal rings are assembled with the cylinder head gasket 20 which is held between the cylinder head 25 and the cylinder block 26.

The projections 15A, 15B do not enter into the regions of the fluid paths 24. Thus, it is possible to reduce the increase of lowing of the passage of the seal subject fluid. Incidentally, by adjusting the depth of the groove 12 and the width of the seal rings 10A, 10B, it is possible to locate the inner face 13 outside the fluid path 24 in the annular radial direction. Also, even if the inner face 13 is located outside the fluid path 24 in the annular radial direction, the seal ability of the seal rings 10A, 10B is not changed.

The thickness D1 of each of the projections 15A, 15B is thinner than the thickness D2 of the inner face 13, and it is preferable to locate each of the projections 15A, 15B in the middle of the inner face 13 in the Z-direction.

As explained above, by setting the thickness D1 and the arrangement of the projections 15A, 15B, in case the cylinder head gasket 20 is arranged between the cylinder head 25 and the cylinder block 26 and is tightened, it is possible not to contact the projections 15A, 15B with the cylinder head 25 and the cylinder block 26. As a result, the change of the surface pressure of the gasket by the projections 15A, 15B at a time of tightening the gasket is avoided.

Also, the projections 15A, 15B are preferably arranged in the center of the peripheral face 13 in the Z-direction. Also, when the seal rings 10A, 10B are molded the a mold, it is preferable to arrange the shape symmetrically. So, by arranging the projections 15A, 15B in the center in the Z-direction, it is advantageous to obtain the symmetricity in the sectional shape.

In accordance with the seal ring groups 10 of the invention, it is possible to identify the product number N1 which is the kind of the seal rings 10A by locking at the projections 14A that the seal rings 10A has, and it is possible to identify the product number N2 which is the kind of the seal rings 10B by locking at the projections 14B that the seal rings 10B has. Actually, when locking at an unknown seal ring in the Z-direction, it is possible to identify the unknown seal rings 10A to be the product number N1 by confirming the semi-spherical four seal rings 15A. Also, when locking at an unknown seal ring in the Z-direction, it is possible to identify the unknown seal ring to be the product number N2 by confirming the polygonal four seal rings 15B.

As such, it is possible to prevent the miss-arrangement, such as the sealing ring 10A is arranged in the oil hole 23 and the seal rings 10B is arranged in the water hole 22, by identifying the kind of the seal rings 10A, 10B.

Also, the projections 14A, 14B do not contribute to the sealing ability and the surface pressure ability by themselves that the sealing rings 10A, 10B have. Namely, the projections 14A, 14B which does not affect the seal rings 10A, 10B and are useless as the seal rings 10A, 10B are intentionally added. Thus, by adding the useless projections 14A, 14B as themselves, is possible to identify the kind of the seal rings 10.

In the above embodiment, by differentiating the shape of the projection 15A of the projecting section 14A and the shape of the projection 15B of the projecting section 14B, the kind of the seal rings 10A, 10B are identified. However, the seal rings 10 of the invention are not limited to this.

In order to identify the kind of the seal rings 10, the number of the projections 15A of the projecting section 14A may only be changed with the number of the projections 15B of the projecting section 14A. For example, the projections 15B of the projecting section 14B may be three relative to the projections 14A explained already.

Also, in order to identify the kind of the seal ring groups 10, the position of the projections 15A of the projecting section 14A may only be changed with the position of the projections 15B of the projecting section 14B. For example, the four projections 15B of the projecting section 14B may be unequally arranged in the annular peripheral direction relative to the projecting section 14A explained already.

In addition, in order to identify the kind of the seal ring groups 10, the number and the position of the projections 15A of the projecting section 14A may be different from the number and the position of the projections 15B of the projecting section 14B. For example, the projections 15B of the projecting section 14B may be three and arranged equally on the inner periphery 13 viewing from the Z-direction (every 120 degrees in the annular peripheral direction).

As explained above, it may be formed such that in the projecting sections 14A, 14B, one or two or all of the combination of the shape, number and the arrangement viewed from the Z-direction may be changed in the groups.

Incidentally, in the explanation of the invention, the shapes of the projections 15A, 15B indicate characteristics on appearance from the view in the Z-direction, and the color of the projections 15A, 15B may be changed by the kind of the projecting sections. Also, the projections 15A, 15B may be applied with different signs and characters (for example, product number) for each kind in the view from the Z-direction.

The seal rings 10A, 10B of the invention may be annular in the Z-direction when assembled with the edges of the through holes, and it is possible to apply even in a different annular shape when it is not assembled.

Further, in case the seal ring groups 10 are two kinds as in the invention, the seal rings 10A may have the projections 14A as explained, and the seal rings 10B does not have projections. Also, the inner peripheral face 13A of the seal rings 10A may be circular shape, and the inner peripheral face 13B of the seal rings 10B may have an oval shape. In this case, the seal rings 10B may be oval so that the inner peripheral face 13B of the seal rings 10B does not enter into the range of the flow path 24 of the seal subject fluid.

Explanation of the Characters

10 Seal ring groups
10, 10B Seal rings
13 Inner peripheral face
14A, 14B Projecting sections
15A, 15B Projections

What is claimed is:

1. Seal ring groups to be assembled with edges of through holes of a gasket, comprising:
    an annular first sealing member having a first upper surface, a first lower surface, a first inner surface between the first upper surface and the first lower surface, and at least one first projection projecting inwardly from the first inner surface, and
    an annular second sealing member having a second upper surface, a second lower surface, a second inner surface between the second upper surface and the second lower surface, and at least one second projection projecting inwardly from the second inner surface,
    wherein the at least one first projection is different from the at least one second projection in shape, number or arrangement thereof.

2. A combination of a cylinder head, a cylinder block, a cylinder head gasket and the seal ring groups according to claim 1,
    wherein the cylinder head and the cylinder block include engine liquid holes, and
    the cylinder head gasket includes gasket liquid holes each having a diameter greater than that of each of the engine liquid hole, the each of the at least one first projection and the at least one second projection being located outside the engine liquid holes.

* * * * *